United States Patent [19]

Buidry

[11] 4,174,985
[45] Nov. 20, 1979

[54] PROCESS FOR MANUFACTURING COUPLING GASKETS FOR HELICALLY CORRUGATED SPIRAL PIPE

[76] Inventor: Kirby J. Buidry, P.O. Box 14386, Baton Rouge, La. 70808

[21] Appl. No.: 935,869

[22] Filed: Aug. 22, 1978

Related U.S. Application Data

[62] Division of Ser. No. 760,702, Jan. 19, 1977, Pat. No. 4,124,236.

[51] Int. Cl.² ............................ B29F 1/00; B29F 3/00
[52] U.S. Cl. .......................... 156/244.18; 156/244.25; 156/245; 156/250; 156/256; 156/304; 285/373; 285/424; 285/DIG. 4
[58] Field of Search ............... 156/137, 138, 139, 140, 156/200, 203, 207, 210, 217, 218, 244.15, 244.18, 244.25, 250, 255, 256, 259, 260, 304, 245; 138/154, 155, 121; 285/373, 424, DIG. 4; 428/59, 167, 169, 182, 184, 185; 264/328

[56] References Cited

U.S. PATENT DOCUMENTS

| | | | |
|---|---|---|---|
| 3,100,658 | 8/1963 | Miller et al. | 156/304 |
| 3,239,254 | 3/1966 | Campbell | 285/424 |
| 3,261,735 | 7/1966 | Brown | 156/304 |
| 3,298,721 | 1/1967 | Wiley | 285/424 |
| 3,315,991 | 4/1967 | Davis | 285/424 |
| 3,447,352 | 6/1969 | Miller | 285/424 |
| 3,455,584 | 7/1969 | Henrickson | 285/373 |
| 3,501,179 | 3/1970 | Boynton et al. | 285/373 |
| 3,708,187 | 1/1973 | Campbell | 285/373 |

*Primary Examiner*—Caleb Weston
*Attorney, Agent, or Firm*—Roy, Kiesel, Patterson & Abadie

[57] ABSTRACT

A process for manufacturing helically corrugated pipe coupling gaskets is provided wherein a sheet of rectangular flexible gasket material is extruded having parallel corrugations on one side, cutting the sheet across the corrugations at an angle which is the complement of the helix angle of the pipe, and then bonding opposite ends of the cut strip to form a circumferentially continuous strip.

4 Claims, 6 Drawing Figures

PROCESS FOR MANUFACTURING COUPLING GASKETS FOR HELICALLY CORRUGATED SPIRAL PIPE

RELATED APPLICATIONS

This is a division of U.S. patent application Ser. No. 760,702 filed Jan. 19, 1977, now U.S. Pat. No. 4,124,236 by the inventor herein, and entitled "Coupling for Helically Corrugated Spiral Pipe", and which mention is made herein for purposes of obtaining benefit of its filing date.

BACKGROUND OF THE INVENTION

1. Field of the Invention

This invention relates broadly to processes for manufacturing helically corrugated pipe gaskets.

2. Prior Art

In general, most applications of helically corrugated pipe require that the pipe be soil tight and convey liquids, such as water, without gross leakage, as this would cause undue setting or erosion of the soil surrounding the pipe. Furthermore, the pipe joints must also provide sufficient strength to maintain the proper alignment of the joined pipe sections throughout the life of the pipe. In joining adjacent sections of helically corrugated, pipe, the prior art has found that the corrugations of the pipe sections to be joined and the corrugations of band-type couplings must be of substantially the same pitch, size and depth. Good examples of this earlier art can be found in: U.S. Campbell Pat. No. 3,239,254 issued Mar. 8, 1966 and entitled "Pipe Coupling," U.S. Wiley Pat. No. 3,298,721 issued Jan. 17, 1967 and entitled "Coupling Band for Joining Corrugated Pipes," U.S. Davis Pat. No. 3,315,991 issued Apr. 25, 1967 and entitled "Pipe Coupling;" and U.S. Campbell Pat. No. 3,708,187 issued Jan. 2, 1973 and entitled "Conduit Seal." However, the use of these coupling devices required that the corrugations of the abutting pipes be aligned so that the band can properly seat on the pipe section ends. This generally requires rotation of one pipe which is very time consuming and not practical, particularly in large diameter pipes. This and other problems, as more completely discussed in U.S. Boynton, et al Pat. No. 3,501,179 issued Mar. 17, 1970 and entitled "Helically Corrugated Spiral Pipe and Coupling Therefor," have led to attempts to rectify these problems. One of the earlier attempts is disclosed in U.S. Davis Pat. No. 3,315,991 issued Apr. 25, 1967 and entitled "Pipe Coupling" and is also discussed in the aforementioned U.S. Boynton, et al Pat. No. 3,501,179. In this disclosure, a pair of narrow, deformable elongated strips having a broad base are strapped to each pipe by a special metal band which, upon tightening, deforms the strips to match the pipe corrugations. The difficulty in such a design is the ability of the deformed narrow strips to form and maintain the necessary seal, particularly in pipes having corrugations with great depth, and in cases where settling of the pipes is likely to occur. For this reason, the most commonly used corrugated pipes, particularly where proper seals are necessary, is reformed pipe wherein the helical corrugations at the pipe ends have been reworked into annular corrugations. This pipe design is much easier to seal with various couplings such as that shown in the aforementioned U.S. Boynton, et al Pat. No. 3,501,179. The effectiveness of this arrangement, as attested by its wide industry usage, however, relies on a reworked pipe whose cost is substantially higher than the helically corrugated spiral pipe. In the Campbell Patent, a segmented sealing strip is disclosed having helically spiraled corrugations. However, leakage resulting from the segmented nature of the strips has deterred the commercial acceptance of this design.

Therefore, if a strip could be economically manufactured that could be applied to helically corrugated pipe in the field that did not leak when the tightening band is applied, it would be welcomed in the industry.

SUMMARY OF THE INVENTION

Therefore, it is an object of this invention to provide a process for manufacturing a circumferentially continuous gasket for use in sealing abutting ends of helically corrugated pipe.

Another object of this invention is to provide a process for manufacturing flexible, helically corrugated pre-formed gaskets for use in the field in a coupling between abutting ends of helically corrugated pipe.

Other objects and advantages of this invention shall become apparent from the ensuing descriptions of the invention.

Accordingly, a process for manufacturing a flexible, helically corrugated gasket is provided by forming (such as by conventional extrusion or injection molding techniques) a rectangular sheet constructed from a flexible material having parallel corrugations of similar pitch and depth and cutting the sheet across its corrugations at an angle corresponding to the complement of the helix angle of the helically corrugated pipe.

PREFERRED EMBODIMENTS OF THE INVENTION

While the gasket formed by this invention can be used on any type corrugated pipe, they are described in the preferred embodiments for use on corrugated spiral pipe, but no limitation in the scope of this invention is intended.

Figure 1:
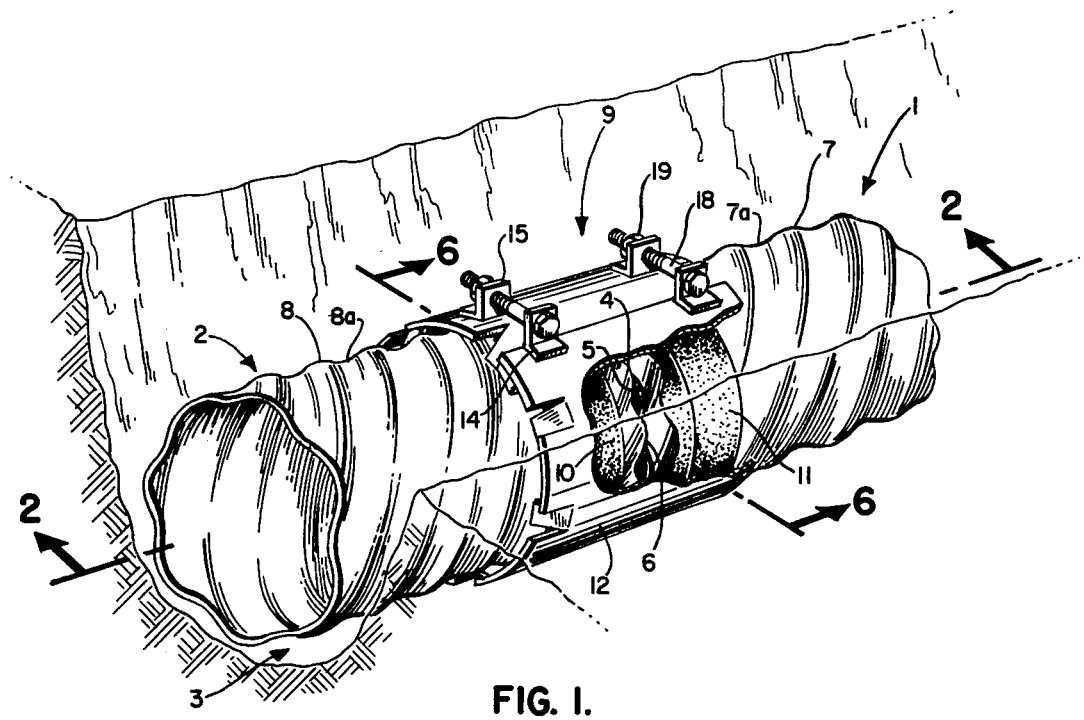
FIG. 1 is a cutaway perspective view of one embodiment of this invention illustrating the positioning of a coupling about abutting helically corrugated spiral pipes.

In a typical use, two helically corrugated spiral pipes 1 and 2 are placed in a trench 3 in an abutting arrangement as shown in FIG. 1. In many cases, a small gap 4 might be found between the abutting pipe ends 5 and 6 of pipes 1 and 2, respectively. Generally, the smaller the pipe 1 and 2, the less gap 4 which exists. As a practical matter, the corrugations 7 and 8 of pipes 1 and 2, respectively, will not match exactly at the abutting ends 5 and 6 unless time consuming adjustments are made. In accordance with this invention, these adjustments are not necessary, but could be made if desired. In order to provide a substantially soil tight joint between the pipes 1 and 2, coupling 9 is secured in position as explained below.

Coupling 9 consists of two flexible, pre-formed gaskets 10 and 11 and a tightening band 12. Each gasket 10 and 11 has corrugations 13 of similar pitch and depth as that of the pipe 1 or 2 which it fits around. In this manner, corrugations 13, when placed about pipe 1 or 2, will mate with pipe corrugations 7 and 8. It is preferred that gaskets 10 and 11 be constructed from material which is slightly deformable so that when band 12 is tightened, gaskets 10 and 11 will sealingly mate with pipe corrugations 7 and 8. By utilizing this particular shape for gaskets 10 and 11, a more uniform compression with less pressure is required, thus insuring a tighter seal being formed. Also, because substantially less compression is necessary, a broader range of materials can be used for forming gaskets 10 and 11 which have greater corrosion and wear characteristics. Suitable material for constructing gaskets 10 and 11 would preferably include various soft rubber materials presently in the marketplace which are slightly compressible.

Figure 5:
FIG. 5 is a cross-sectional view taken along the lines 5—5 of FIG. 3.
Figure 4:
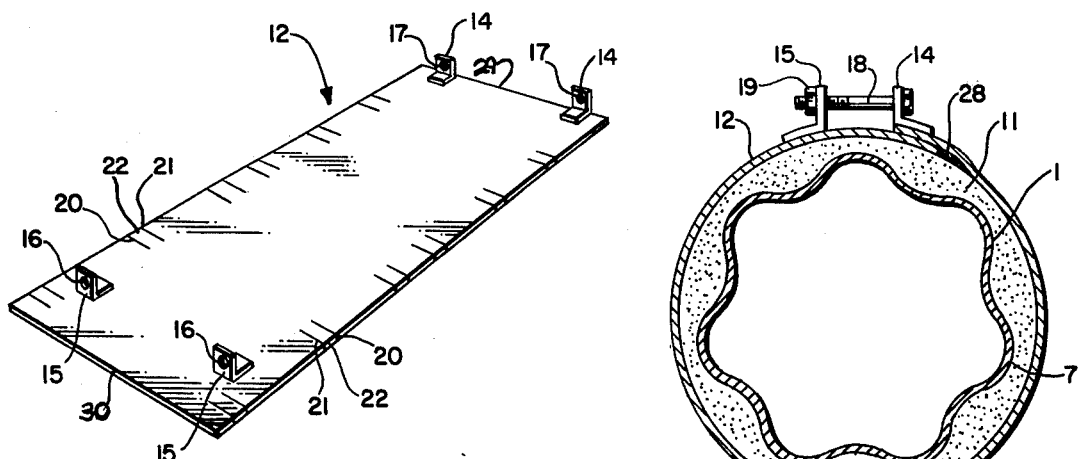
FIG. 4 is a perspective view of a preferred embodiment of the metallic tightening band having irregularly positioned notched tabs for preventing lateral movement of the abutting pipes.
Figure 6:
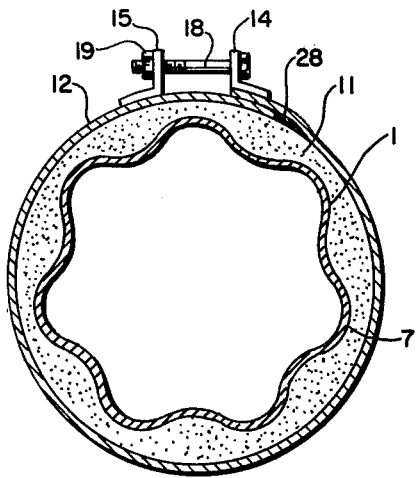
FIG. 6 is a cross-sectional view taken along lines 6—6 of FIG. 1.

Band 12, preferably metallic, for providing the desired rigidness, is a rectangular band provided with conventional clamping shoulder sections 14 and 15 with openings 16 and 17, respectively, through which bolt 18 passes and is tightened by nut 19 (see FIG. 1). Band 12 should be wide enough to fit over both gaskets 10 and 11. Also, it is preferred that one of the shoulder sections 14 or 15 (shown as 14 in FIG. 4) be set back from edge 29 of band 12 so that, when positioned about gaskets 10 and 11, band edges 29 and 30 overlap one another as shown more clearly in FIG. 5. In this embodiment, it is preferred that a sealant 28 be placed between the overlapping edges 29 and 30 to insure a proper seal at this position as is well known in the art.

In a preferred embodiment, band 12 is provided with pairs of parallel slits 20, 21 which create tongue areas 22 in band 12. After band 12 is wrapped around strips 10 and 11, these tongue areas can be depressed into pipe valleys 7a or 8a. This reduces and helps eliminate any lateral movement of pipes 1 and 2 due to settling of the soil in trench 3. In a more preferred embodiment, slits 20, 21 will be irregularly spaced apart so that band 12 can be universal and used for all different sized pipes.

The coupling 9 can be assembled about pipes 1 and 2, either before or after they have been laid in trench 3.

Figure 2:
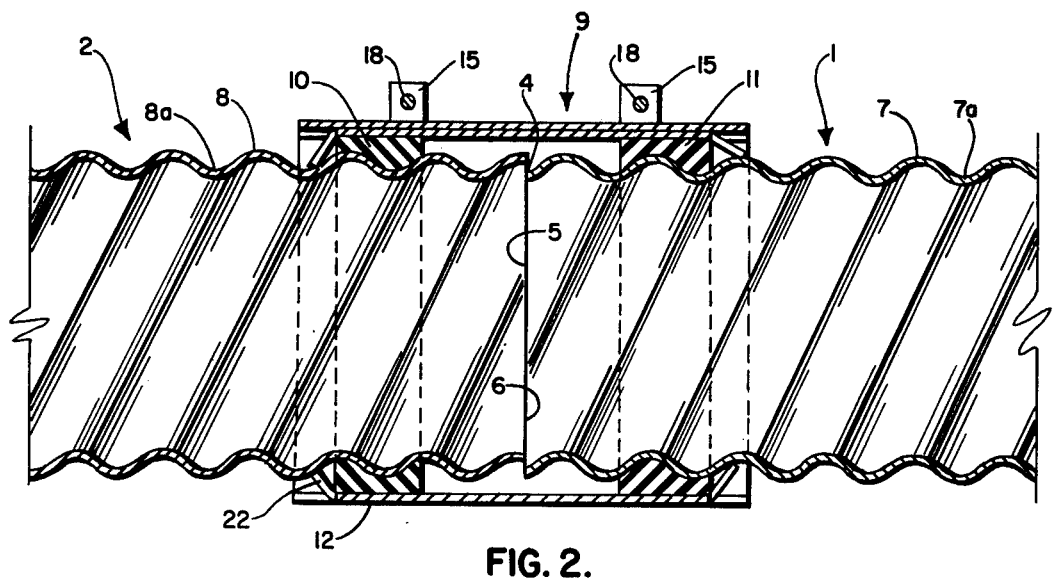
FIG. 2 is a cross-sectional view taken along lines 2—2 of FIG. 1.
Figure 3:
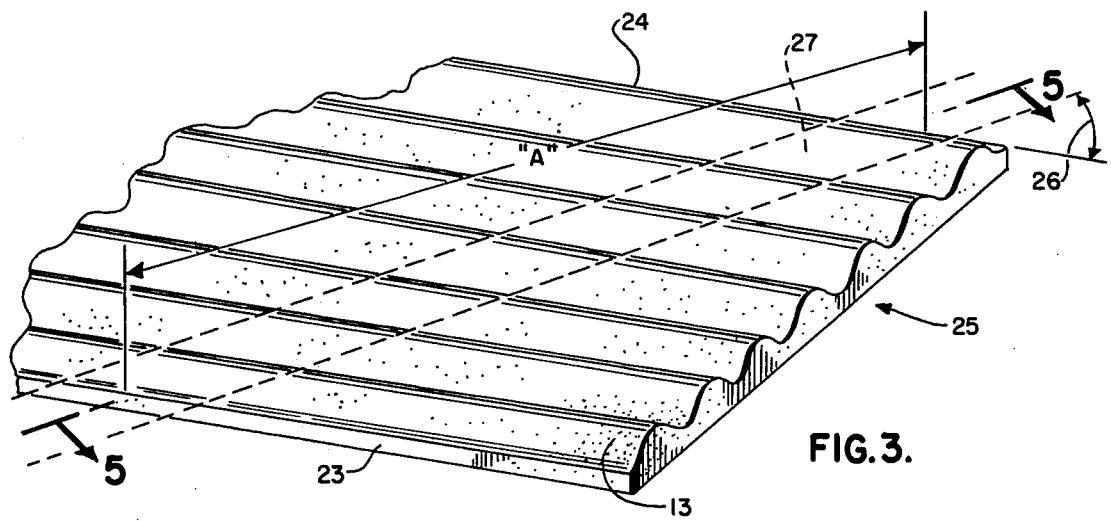
FIG. 3 is a perspective view of one embodiment of a sheet of gasket material having parallel annular-type corrugations that can be used when cut where illustrated to form the gaskets usable in a pipe coupling.

To manufacture the strips, a sheet 25 of conventional gasket material having parallel corrugations 13 of the same pitch and depth of pipes 1 and 2 is formed by conventional extrusion or injection molding techniques. In this manner, sheet 25 can be produced in a continuous manner or in any length desired. These corrugations 13 are parallel to edges 23 and 24 of sheet 25 and have a similar pitch and depth as are the corrugations 7 and 8 of pipes 1 and 2. Next, this sheet 25 is cut between edges 23 and 24 as shown by the dotted lines in FIG. 3. The angle 26 of the cut is preferably the complement of the helix angle of the pipes 1 and 2. The helix angle is the angle defined by the seam of the pipe and the longitudal axis of the pipe. The direction of the slant of the cut will depend on whether the strip is to fit a left-hand or right-hand spiral pipe. The strip 27 shown in FIG. 3 is for a right-hand spiral pipe rather than the left-hand spiral pipe shown in FIGS. 1 and 2. It is preferred that the width of sheet 25 be substantially identical to the perpendicular distance between the center of the seams of pipe 1 or 2 when the metal sheet forming the pipe is unrolled. Hence, the length "A" of the cut sheet will equal the circumference of pipes 1 and 2. However, it may be desirable from an economical standpoint to extrude sheet 25 in some width less than the perpendicular distance between the seams of pipes 1 and 2. In this case, it is preferred that the width be some whole number fraction of the perpendicular distance between the seams of pipes 1 and 2 so that the resulting strips can simply be heat bonded or permanently glued to one another to form a strip having a width equal to the perpendicular distance between the seams of pipes 1 and 2.

Once sheet 25 has been cut to form the parallelogram shaped strips, the opposite ends 29 and 30 of these strips are heat bonded or permanently glued to form the gaskets of this invention.

There are, of course, many other alternates and embodiments of the invention not specifically mentioned, such as the use of this invention with arch pipe and no intention to exclude these from the scope of the invention is meant, as the scope of the invention should be limited only by the following claims.

What I claim is:

1. A process for manufacturing flexible helically corrugated gaskets for use in a coupling for providing a substantially soil tight joint between abutting ends of helically corrugated pipe which comprises:
    (a) forming a sheet constructed of flexible material and having parallel annular-type corrugations having a similar pitch and depth similar to the corrugation of said pipe,
    (b) angularly cutting said sheet across said corrugations to form a strip, said angular cut being approximately identical to the complement of the helical angle of said pipe, and
    (c) permanently attaching the opposite ends of said strip to one another.

2. A process according to claim 1 wherein said sheet is formed by extrusion.

3. A process according to claim 1 wherein said sheet is formed by injection molding.

4. A process according to claim 1 wherein said sheet is formed having a width substantially identical to a perpendicular distance between the seams of said pipe.

* * * * *